June 20, 1950     S. M. MERCIER     2,512,361
BEARING TEMPERATURE CONDITIONING AND
LUBRICATING SYSTEM AND APPARATUS Filed April 8, 1947     3 Sheets-Sheet 1

INVENTOR,
STANLEY M. MERCIER,
BY
ATTY.

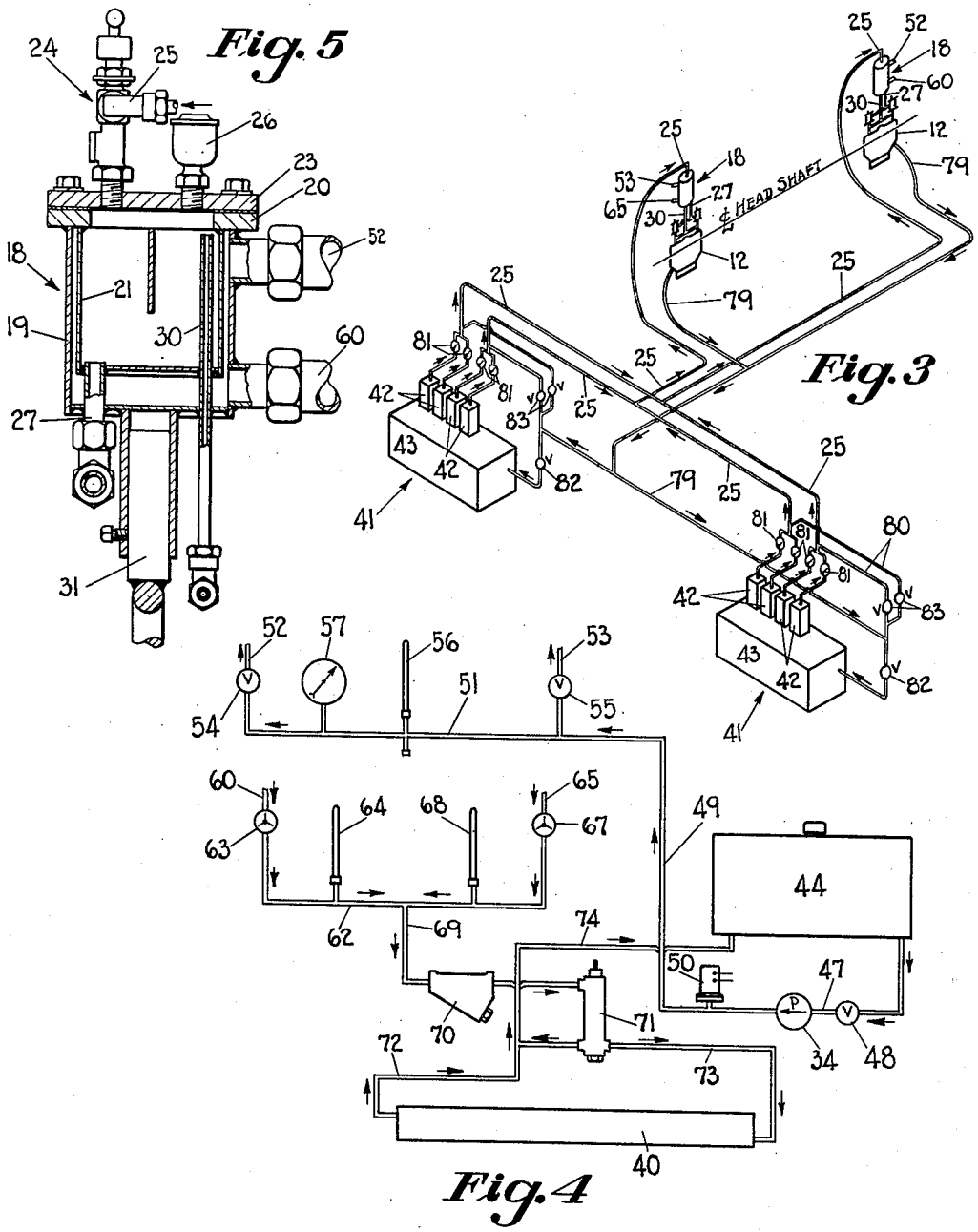

June 20, 1950

S. M. MERCIER 2,512,361

BEARING TEMPERATURE CONDITIONING AND
LUBRICATING SYSTEM AND APPARATUS

Filed April 8, 1947

INVENTOR:
STANLEY M. MERCIER,

BY

ATTY.

Patented June 20, 1950

2,512,361

UNITED STATES PATENT OFFICE 2,512,361

BEARING TEMPERATURE CONDITIONING AND LUBRICATING SYSTEM AND APPARATUS

Stanley M. Mercier, Bexley, Ohio, assignor to The Jeffrey Manufacturing Company, a corporation of Ohio Application April 8, 1947, Serial No. 740,012

2 Claims. (Cl. 184—6)

This invention relates to an improved system and apparatus for conditioning, that is, either cooling or heating, the lubricating oil delivered to the bearing means of an elevator or conveyer.

An object of the invention therefore is to provide an improved system of lubricating a shaft bearing and associated shaft portion of a conveyer or elevator and simultaneously controlling the temperature of the lubricating oil or fluid either to cool it or heat it, as conditions require, and preferably also to condition the temperature of the portion of the shaft associated with said bearing.

A further object of the invention is to provide an improved lubricating system for a conveyer in which the lubricant is either cooled or heated, as conditions require.

A further object of the invention is to provide an improved lubricating device with means to condition the temperature of the lubricant therein.

Still another object of the invention is to provide an improved lubricating temperature conditioning unit which may be employed to deliver temperature conditioning lubricating oil or fluid.

Other objects of the invention will appear hereinafter, the novel features and combinations being set forth in the appended claims.

In the accompanying drawings,

Fig. 3 is a diagrammatic piping diagram of the closed circuit lubricating system of the invention;

Fig. 4 is a piping diagram which is supplemental to the diagram of Fig. 2 and is somewhat enlarged relative thereto;

Fig. 5 is a sectional elevational view of one of the oil pots which constitutes one of the features of the invention;

While in its broader aspects the system herein disclosed may be used with various types of apparatus, in its specific aspect it is designed particularly as a portion of a hot elevator, such as the thermo-catalytic cracking type, disclosed in my application Serial No. 700,928, filed October 3, 1946, entitled Bucket Elevator.

Figure 1:
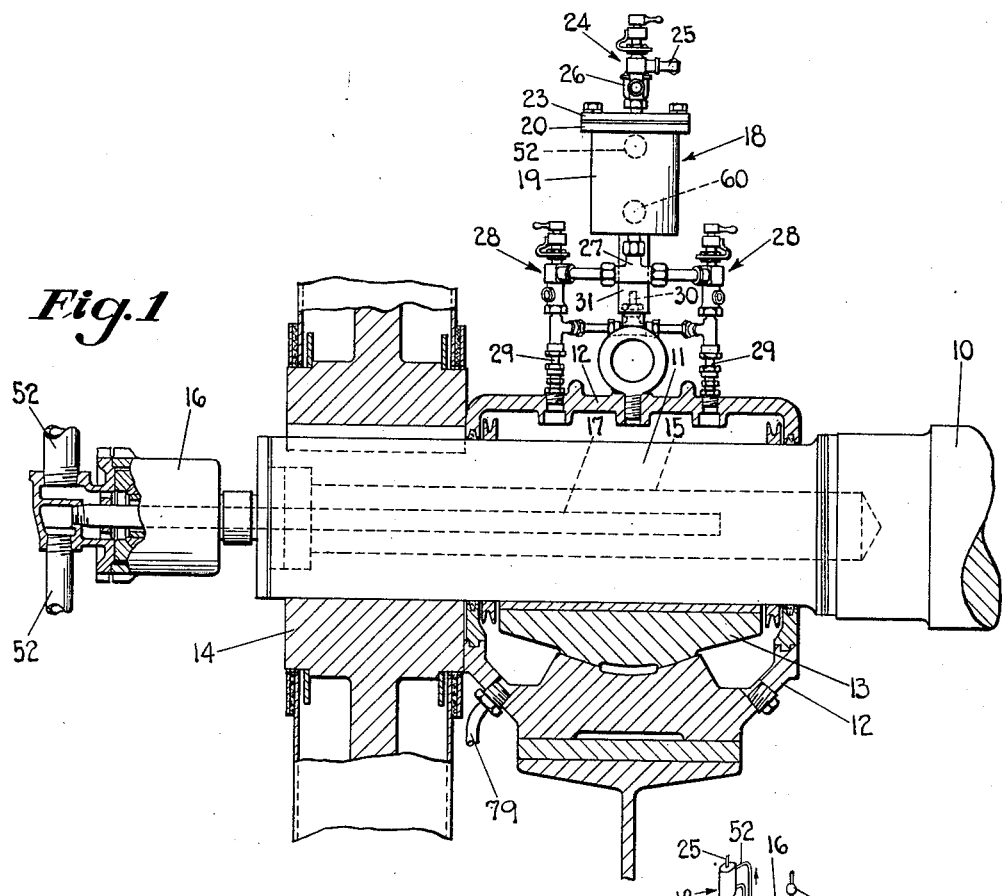
Fig. 1 is a sectional elevational view through a head shaft and one of the bearings of an elevator or conveyer, incorporating the features of my invention, showing a portion of the lubricating mechanism in elevation and a portion of the shaft cooling mechanism in elevation and section.

In Fig. 1 of the drawings only a very small portion of the hot elevator is shown, it being understood, however, that the elevator of said application Serial No. 700,928 is that employed. As illustrated in detail in said application Serial No. 700,928 the hot elevator is provided with a head shaft, illustrated at 10 in Fig. 1 of the drawings, the opposite ends of which have bearing portions, one of which is seen at 11, which extends through an enclosing bearing casing or housing 12. A journal bearing 13 within said housing 12 supports each end of the shaft 10 through its cooperation with the associated shaft portion 11.

The general construction of the bearing 13 and associated housing 12 is claimed in my application Serial No. 570,950, filed January 1, 1945, now Patent Number 2,430,236, entitled Bearing and Shaft Assembly.

The head shaft 10 is driven by a gear 14 keyed to the outer end thereof. As disclosed in more detail in my application Serial No. 500,799, filed Sept. 1, 1943, now Patent Number 2,372,708, the bearing portion 11 of shaft 10 is normally cooled by causing a liquid or fluid to flow into a recess 15 therein, by being supplied by a distributor 16 which includes an elongated pipe 17 extending into the shaft recess 15. Conditioning fluid, either cooling or heating, delivered to the feed pipe of the distributor 16 will flow over an obvious path into and out of the recess 15, thus effecting a conditioning action on the bearing portion 11 of said shaft and indirectly upon the bearing 13. Stated another way, this conditioning fluid, either heating or cooling, effectively conditions both the bearing portion 11 of the shaft 10 and the bearing 13.

Figure 2:
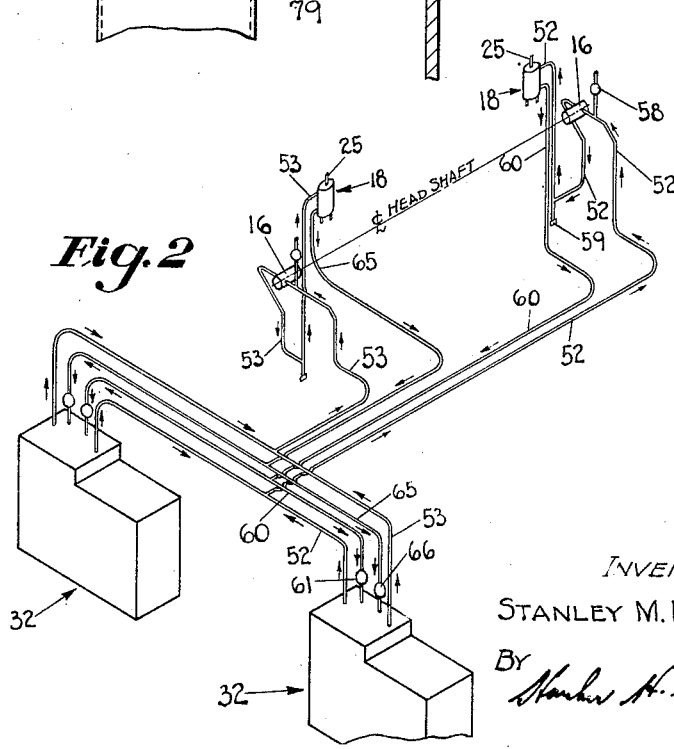
Fig. 2 is a diagrammatic piping diagram showing part of the closed temperature conditioning circuit of the improved system.

Lubricating oil is delivered to the interior of the housing 12 at spaced points by being dropped, preferably drop by drop, on the shaft bearing portion 11 from an oil pot 18 and associated mechanism, there, of course, being such lubricating mechanism adjacent each end of the shaft 10, as illustrated in Figs. 2 and 3 of the drawings. The detailed structure of this oil pot and associated mechanism is shown in Figs. 1 and 5 of the drawings and it may be stated that it is so constructed that the oil contained therein or in a reservoir which is formed thereby is conditioned, that is, either heated or cooled, by circulating conditioning medium as hereinafter described more completely.

Each oil pot 18 comprises an outer cylindrical casing 19, the top of which is welded to a top ring 20. Also welded to said top ring 20 and spaced inwardly of the casing 19 is an inner casing or receptacle 21 which provides a lubricant reservoir or container. The receptacle 21 is spaced from the inner walls of the casing 19 whereby said casing 19 acts as a temperature conditioning jacket for the receptacle 21, and the space between said casings 19 and 21 is adapted to be filled with temperature conditioning fluid which is delivered thereto by way of a pressure conduit 52 and a return conduit 60. Removably attached to the top ring 20 is a top cover plate 23 which is provided with an oil receiving fitting 24 which may, for example, be what is commercially known as a Lunkenheimer Sight Feed Valve, preferably having the needle valve removed so that the lubricant feeding line or conduit 25, which leads thereto, is always in communication with the reservoir 21. The top plate 23 is also preferably provided with an oil cup 26 which may be filled with waste and which provides for delivery of oil to the reservoir 21 by a hand lubricator for emergency conditions.

Extending through the bottoms of the casings 19 and 21 and in communication with the interior of the casing 21 is a delivery pipe 27 which branches to a pair of variable drip fittings 28 which, for example, may be commercially known as Lunkenheimer Sight Feed Valves. These drip fittings 28 are preferably complete so that the drip rate may be adjusted by each of them separately. The outputs of the drip fittings 28 lead through appropriate conduits 29 to the interior of the casing 12 at spaced positions along the axis of the shaft 10 so that the lubricating oil, or the like, will be dropped, preferably drop by drop, onto the bearing portion 11, thereby to lubricate it.

Under normal conditions it is contemplated that the system will be operated so that the receptacle or casing 21 constituting the conditioning reservoir for the oil will be at least half full of oil and this will possibly vary. To take care of an overflow condition an overflow pipe 30 extends through the bottoms of the casings 19 and 21, and the open top is adjacent and slightly below the ring 20 which will determine the maximum oil level in said reservoir 21. Oil flowing into the tube or pipe 30 is conducted by branch conduits into the conduits 29, as illustrated in Fig. 1 of the drawings, and thereby delivered to the interior of casing 12 from which it can be circulated, as hereinafter described, through the closed lubricating system.

The pot 18 is adjustably mounted on a post 31 provided on the top of the casing 12.

Figure 6:
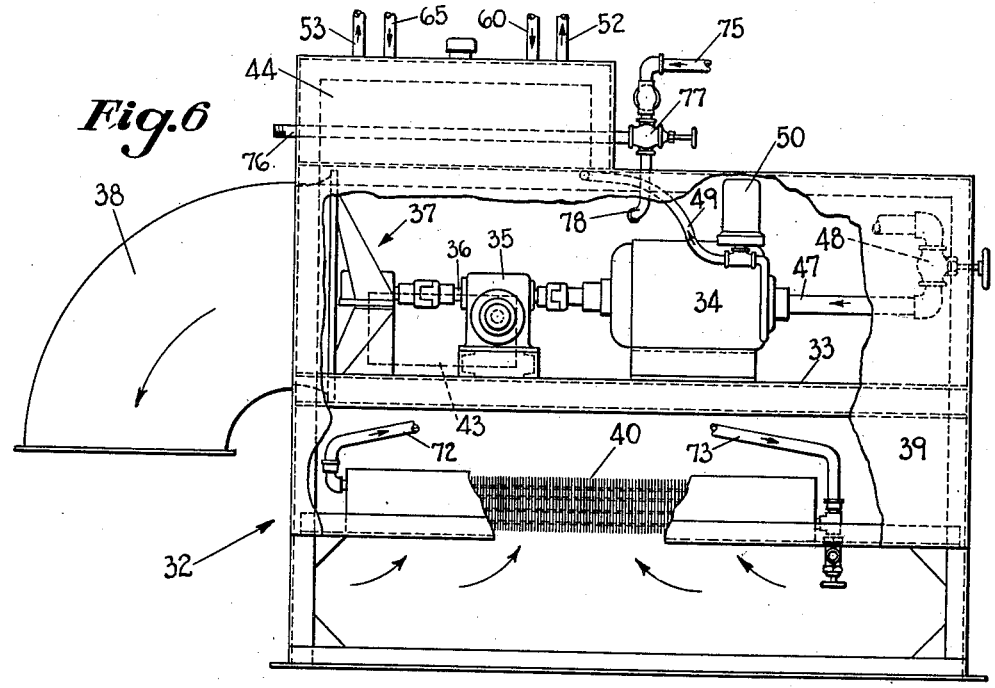
Fig. 6 is a side elevational view of the combined lubricating and temperature conditioning unit, with parts of the cover broken away.
Figure 7:
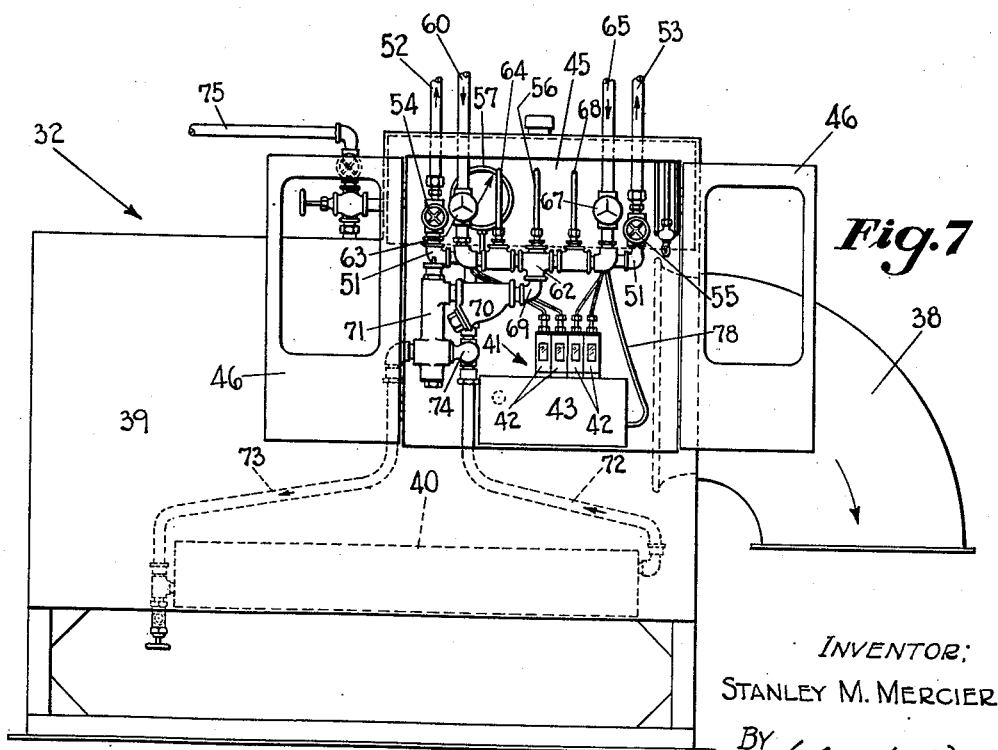
Fig. 7 is a view of the opposite side of the unit of Fig. 6, showing the doors of the cabin open.

Attention is now directed particularly to Figs. 6 and 7 of the drawings and to the structure of the control and power units which are provided. As illustrated in Figs. 2 and 3 of the drawings, there are preferably two of these units employed, though one of them is a stand-by unit and consequently only one is normally in operation, the other being shut off by control valves hereinafter described. Each controlling power unit comprises a frame 32 having a horizontal platform 33 approximately adjacent its center which has a vertical longitudinally extending partition, on one side of which and on the platform 33 is a combination electric motor and temperature conditioning fluid pump 34. The motor portion thereof drives a speed reducer 35 and has an output shaft 36 which effectuates a direct drive to a fan 37 preferably provided with a downwardly extending discharge elbow 38.

The platform 33 is preferably open on opposite sides of the speed reducer 35 so that the fan 37 in operating will draw air upwardly between the side plates of the frame 32, one of which is seen at 39, so that said fan 37 will draw air across a radiator 40 supported by frame members below the platform 33 and between the side and end plates of the frame 32. Thus the fan 37 cooperates with the radiator 40 and this is employed, as hereinafter described more completely, to cool the circulating coolant or conditioning fluid, preferably water or a mixture of water and anti-freeze, such as alcohol, "Prestone," or the like.

A low speed shaft extends transversely through the above-mentioned partition of the frame 32 into a lubricating unit 41 on the other side thereof which preferably comprises four separate pumps 42 driven from a common cam shaft and mounted on an oil reservoir 43.

The lubricating unit 41 may be what is known commercially as a "Manzel" Force Feed Lubricator involving four individual pumps having the common reservoir 43. In addition to the motor drive for the "Manzel" unit 41 it preferably has a manual drive by which it can be operated in a manner which is common with said units.

At one end of the frame 32 and projecting upwardly from the main portion thereof is a conditioning liquid tank or reservoir 44 which is adapted to receive and store the temperature conditioning fluid or liquid.

The "Manzel" unit, above described, together with a number of other control units, valves, indicators, thermometers, etc., are contained in a compartment 45 provided on the frame 32 and preferably having a pair of swinging doors 46 provided with windows. The other elements of each controlling power unit will be described in connection with the lubricating system or circuit and the coolant or temperature conditioning system or circuit now to be described.

Considering first the coolant or temperature conditioning system or circuit and starting with the tank or reservoir 44, which is best illustrated in Fig. 4 of the drawings, the temperature conditioning fluid or liquid is drawn from said tank 44 through a feed pipe 47 (see also Fig. 6) which is controlled by a shut-off valve 48.

The output of the pump portion of the combination motor pump 34 is delivered to a high pressure feed pipe or conduit 49 having a flow alarm switch 50 connected therein which closes an alarm circuit whenever the motor and pump 34 rotate and fluid pressure is not present in conduit 49. Conduit 49 leads to a manifold 51 which is within the compartment 45, as illustrated in Fig. 7, and which is formed of nipples, fittings, elbows, etc., from which manifold a pair of pressure pipes, lines or conduits 52 and 53 extend, having individual control or regulator valves 54 and 55, respectively, therein.

A thermometer 56 is provided in an appropriate fitting in the manifold 51 and measures the temperature of the conditioning fluid therein as it leaves the pump 34. A pressure gauge 57 is also connected to said manifold 51 and indicates the pressure therein.

As illustrated in Fig. 2 of the drawings, the pressure line 52 first extends to and through the aforedescribed distributor 16 and associated pipe 17, thus delivering the conditioning fluid to condition the bearing portion 11 of shaft 10 and associated bearing 13. A bleeder pipe and associated bleeder valve 58 is also connected with the conduit 52 adjacent the input to pipe 17.

From the distributor 16 the pipe 52 continues to the previously described oil pot 18, there being a drain pipe and associated drain plug 59 interposed therein between the distributor 16 and said oil pot 18.

The return line, pipe or conduit 60 extends from the oil pot 18 through a shut-off valve 61 (see Fig. 2) to a return line manifold 62 (see Figs. 4 and 7) formed of nipples, elbows, fittings, and the like, as clearly illustrated in Fig. 7 of the drawings. In said line 60 and associated with said manifold 62 is a rotary flow indicator 63 which indicates the rate of flow of conditioning liquid therein. A thermometer 64 indicates the temperature of the returned conditioning fluid flowing through pipe 60 into manifold 62.

The parallel pressure line 53, which extends from the pressure manifold 51 through a circuit similar to that above described, delivers temperature cooling fluid to the other distributor 16 and associated shaft end and bearing cooling or conditioning apparatus and to the other oil pot 18 which is associated with the opposite end of the shaft from that just described, as clearly illustrated in Fig. 2 of the drawings; the return pipe or conduit for this parallel branch of the temperature conditioning circuit being labeled 65 and having a shut-off valve 66 therein. Pipe 65 has a flow indicator 67 connected therein, and a thermometer 68 is connected with the portion of manifold 62 which is fed by pipe 65, indicating the temperature of the coolant fluid returned by way of said pipe 65.

The returned fluid from the pipes 60 and 65 received by the manifold 62 is delivered to a common conduit or pipe 69 and passes through a strainer 70, thence through a thermostatically controlled regulator blender 71 which selectively delivers the returning fluid to pass through the radiator 40 by feed and return pipes 72 and 73, respectively, or merely bypasses said radiator 40 in case the temperature of the returned fluid is sufficiently low to meet the adjustable setting of said regulator blender 71.

The by-passed or radiator cooled fluid is then delivered by a conduit or pipe 74 to the tank or reservoir 44, thus completing the closed circuit for the temperature conditioning fluid. As above described this circuit has two similar parallel paths which deliver conditioning fluid to both the shaft ends and associated bearings and to their associated lubricators. Also, as illustrated in Fig. 2 of the drawings, there are duplicate units 32, but only one of them is operated at a time, the non-operating unit having its valves 54, 55, 61 and 66 shut off.

The temperature conditioning fluid may be either heated or cooled, depending upon the particular demands of the moment and, in fact, in many instances the temperature conditioning fluid may be heated until the elevator is started in operation and after it is in operation it may be cooled. The cooling is effected by the fan 37 and associated radiator 40, as above described, and controlled by the thermostatically controlled regulator blender 71.

The heating of the temperature conditioning fluid may selectively be effected by supplying steam or any other desired heating medium, preferably by conduction or convection, to the conditioning fluid while it is in the tank or reservoir 44. To this end a steam pipe or line 75 (see Fig. 6) is provided with a branch pipe 76 extending through the reservoir 44, and an individual control valve 77 is provided for controlling the flow of steam through the pipe 76. Likewise, provision is made for heating the lubricating oil in the reservoir or tank 43 of the "Manzel" unit. To this end a second branch pipe 78 (see Fig. 6), having an individual control valve, not shown, is provided which extends through said lubricator reservoir 43.

The heating of the temperature conditioning fluid and/or the lubricating oil will generally be desired when the hot elevator is first started in operation and is in a cold area. For example, a hot elevator might be started in operation where the temperature was at freezing and it would be very desirable to warm up both the lubricating oil in the "Manzel" unit 41, as well as in the oil pot 18 and also heat up the shaft bearings. This could readily be done by applying the steam heat or other form of heat to the conditioning fluid and to the oil, as above described, and start circulation of both the lubricating oil and the temperature conditioning fluid prior to the actual starting of the elevator in operation.

On the other hand, after the elevator is in operation and due to the extreme temperatures within said housing, as described in my application Serial No. 500,799, it will quite generally be desirable to circulate a cooling fluid through the temperature conditioning closed circuit which will bring into play the fan 37 and radiator 40.

The lubricating circuit is illustrated particularly in Fig. 3 of the drawings and will now be described. As above mentioned, there are duplicate pumping units 41, but only one of them will be in operation at a time, the other being a stand-by unit. Lubricating fluid, such as oil, in the tank 43 is pumped to a pressure line 25 by the right-hand pair of pumping units 42 of right-hand unit 41, as viewed in Fig. 3 of the drawings and connected in parallel through individual check valves 81. This insures some delivery of lubricating fluid to the conduit 25, if either of the right-hand pumping units 42 should fail. The lubricating oil delivered to line 25 flows to the previously described reservoir 21 of oil pot 18 where it is subjected to the conditioning action of the temperature conditioning fluid flowing through the previously described coolant circuit or system, and the oil is dropped onto the bearing surface 11 in casing 12, as above described. The oil is drained from the bottom of casing 12 by way of return conduit or line or pipe 79 and flows to the reservoir 43 under the control of valve 82.

The left-hand pair of pumping units 42, of unit 41, as viewed in Fig. 3 of the drawings, are similarly connected to a pressure line leading to the left-hand oil pot 18, as viewed in said Fig. 3 of the drawings, the drain from the associated bearing housing 12 returning to the return line 79, as likewise clearly illustrated in Fig. 3 of the drawings.

By-pass or drain lines 80, having individual control valves 83, are provided from the pressure or output lines from pumping units 42 to the reservoir 43.

In the operation of the system only one of the control and power units 32, which, of course, includes the associated lubricating units 41, will be operated at one time. When put into operation lubricating fluid, such as oil, will be circulated over a closed circuit to the bearings for the head shaft 10 of the hot elevator or conveyer, the two bearings at opposite ends thereof preferably being lubricated over parallel branches of this closed circuit. At the same time, during a starting operation in cold weather the lubricating oil will be heated in the oil reservoir of the pumping unit and will also be heated by action of the temperature conditioning fluid in each of the oil pots 18, since the reservoir thereof is bathed in or surrounded by a body of temperature conditioning liquid or fluid flowing in the temperature conditioning closed circuit. This temperature conditioning fluid will be pumped over the closed temperature conditioning circuit which preferably has two branches, one adjacent each end of the shaft, both to act directly upon the shaft bearing means to heat it and also to act on the lubricating oil just prior to its delivery to the bearing means, also to heat it.

During normal operations, where the shaft 10 is hot and it is necessary to dissipate heat from the bearings 11 and 13 to prevent damage thereto, the circulating fluid in the temperature conditioning circuit will be cool relative to the temperature of the shaft 10 and this will cool the bearing means directly as well as cool the oil or lubricant just prior to its delivery to the bearing surfaces.

It is to be particularly noted that during the starting operation, when the apparatus is cold, the actual final warming of the lubricant in the oil pot 18 is just prior to its delivery to the bearing surfaces. This prevents undesirable cooling off of the oil between the time it leaves the pumping units 42 and the time it reaches the bearing surfaces 11 and 13, which might be present if the warming of the oil was limited to that at the pumping units. It is to be understood, however, that within certain broad aspects of my invention the temperature conditioning of the lubricant may be effected only near the pumping units, which would simplify the system somewhat.

It is also to be noted that the lubricating system is a completely closed system and appropriate filter and strainer means are provided in the pumping or "Manzel" unit 41. Likewise, the temperature conditioning liquid is operated in a closed circuit and an appropriate strainer 70 is provided to remove any foreign matter.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A bearing lubricating system including bearing means, a closed circuit for supplying a lubricant to said bearing including lubricant pumping means, means for conditioning the temperature of said lubricant and said bearing means including a closed circuit having a temperature conditioning fluid therein, and means to cause said fluid to flow to said lubricant supplying means and also to said bearing means, said closed lubricant circuit including a lubricant accumulator adjacent said journal bearing means having a conditioning chamber associated therewith which is in said closed conditioning circuit.

2. In combination, a head shaft for an elevator, spaced journal bearings at opposite ends of said shaft, a closed lubricating circuit including pumping means for supplying lubricant to said bearings and shaft, a lubricant reservoir adjacent each bearing in said closed circuit, a closed circuit for conditioning said lubricant and the ends of said shaft including a circulating pump, a conditioning jacket for said reservoirs connected in said closed conditioning circuit, and means in said conditioning circuit for circulating conditioning fluid inside the ends of said shaft adjacent said journal bearings.

STANLEY M. MERCIER.

REFERENCES CITED

The following references are of record in the file of this patent:

UNITED STATES PATENTS

| Number | Name | Date |
|---|---|---|
| 418,123 | Grimm | Dec. 24, 1889 |
| 810,844 | Crawford | Jan. 23, 1906 |
| 901,473 | Rice | Oct. 20, 1908 |
| 1,111,432 | Williams | Sept. 22, 1914 |
| 1,334,844 | Day | Mar. 23, 1920 |
| 1,528,666 | Friedmann | Mar. 3, 1925 |
| 2,103,105 | Young | Dec. 21, 1937 |
| 2,378,351 | Young | June 12, 1945 |